June 14, 1938.                    V. E. TILLSON                    2,120,533
                        METHOD OF MAKING ROLLER BEARINGS
                    Filed Oct. 20, 1934           2 Sheets-Sheet 1
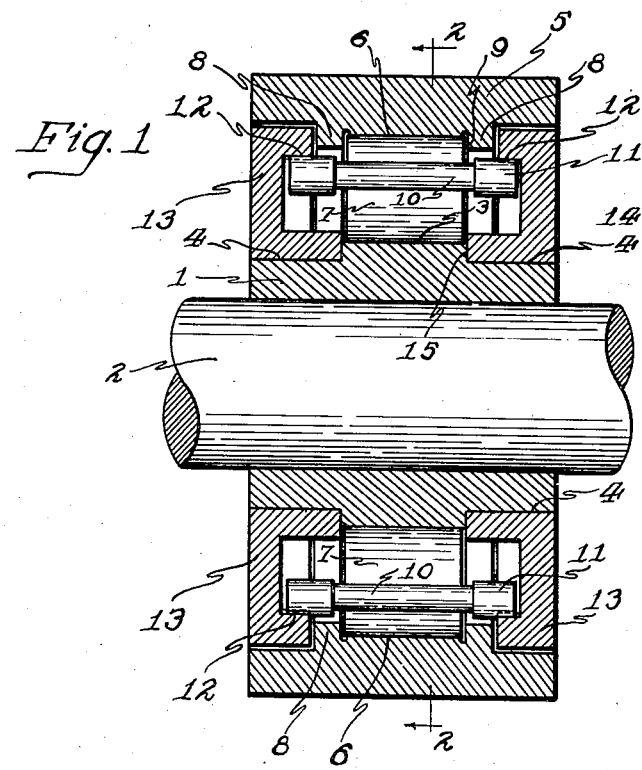
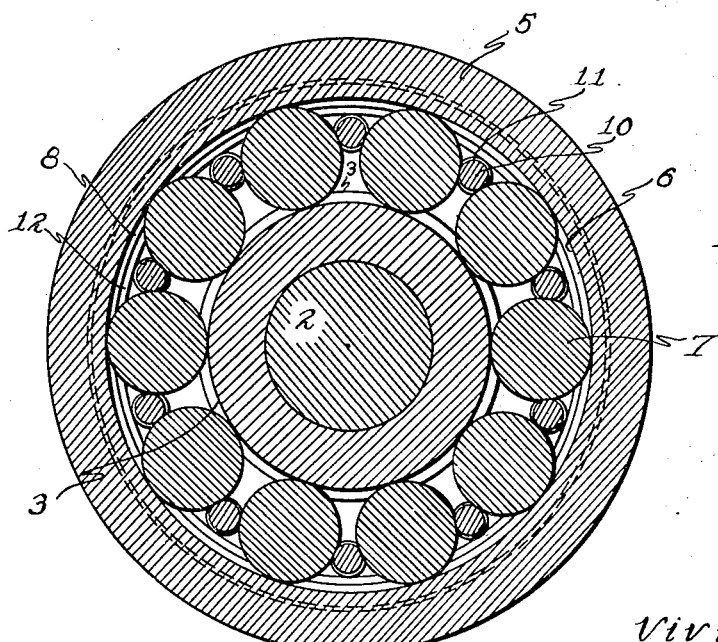
Inventor
Vivian E. Tillson June 14, 1938.   V. E. TILLSON   2,120,533
METHOD OF MAKING ROLLER BEARINGS
Filed Oct. 20, 1934   2 Sheets-Sheet 2

Inventor
Vivian E. Tillson
Attys.

Patented June 14, 1938

2,120,533

UNITED STATES PATENT OFFICE 2,120,533

METHOD OF MAKING ROLLER BEARINGS

Vivian Earle Tillson, L'Anse, Mich., assignor to Tillson Bearing Corporation, L'Anse, Mich., a corporation of Michigan Application October 20, 1934, Serial No. 749,210

6 Claims. (Cl. 29—148.4)

The main objects of this invention are to provide an improved form of roller bearing with improved arrangement and structure of parts for simplifying the manufacture of such bearings without loss of the advantages of extreme mechanical accuracy in eliminating friction; and to provide an improved method of assembling the parts of such bearings whereby the intentional use of an excess of material in one or more places and the temporary strain and friction during the initial operation of the parts themselves can be utilized for obtaining a high degree of mathematical accuracy in the relative dimensions of the parts to assure an almost frictionless normal performance of the bearing, even with considerable tolerance in the dimensions of the principal elements of the structure.

For the purpose of illustration, I have shown two specific embodiments of the invention in the drawings in which:

Figure 1 is an axial section of a form of the bearing in which the axes of the spacer rollers lie outward of the axes of the bearing rollers with respect to the axis of the bearing as a whole.

Fig. 2 is a transverse section taken on the line 2—2 of Fig. 1.

Figure 3:
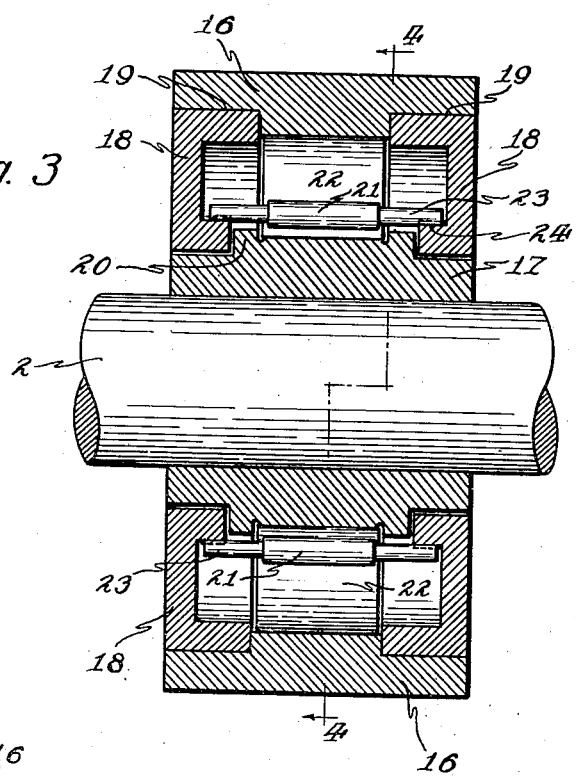
Fig. 3 is an axial section of a modified form of the bearing in which the axes of the spacer rollers lie inward of the axes of the bearing rollers.
Figure 4:
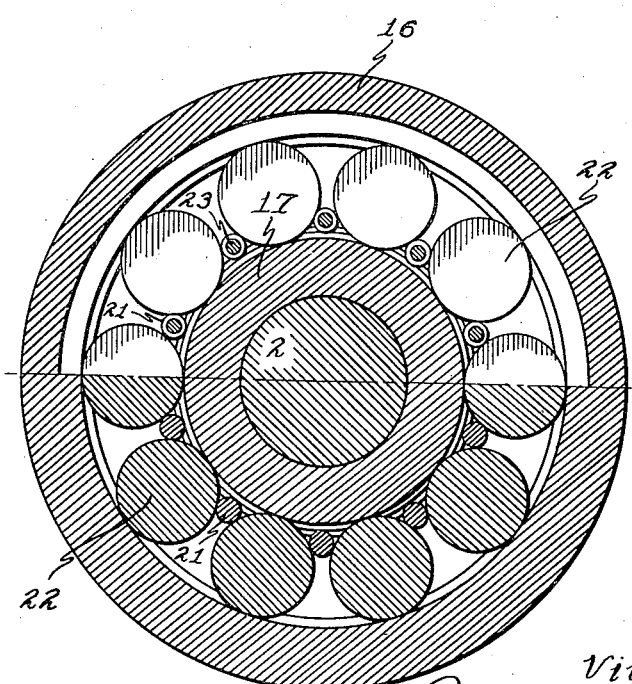
Fig. 4 is a transverse section on line 4—4 of Fig. 3.

The two forms of bearing shown in the drawings are for the most practical purposes interchangeable but I prefer to use the form shown in Figures 1 and 2 in places where the outer part of the bearing is stationary and the shaft is driven; and to use the form shown in Figures 3 and 4 in places where the shaft is stationary and the outer member rotates, for the reason that in such arrangements the rotating member, through rolling engagement of driven races with both the bearing rollers and their spacers, drives them both and assures that their engagement with each other is a substantially pure rolling contact without slippage. Also the form shown in Figures 1 and 2 gives greater ruggedness for heavy duty under severe loads at relatively slow speed. The form shown in Figures 3 and 4 is more adaptable to extremely high speeds under light load conditions.

My new bearing is designed for assembly as a comparatively inexpensive unit in the form of a composite collar that is intended to be inserted into a machine as a single unit, and requiring no adjustments or other assembling operations of any kind on the part of the user.

The device shown in Figure 1 comprises an inner sleeve or bearing member 1 bored to fit a shaft 2 for which it is intended and having a central annular bearing race 3 throughout its middle portion with depressed seats 4 at each end. The outer bearing member 5 has a cylindrical exterior and on its inner face has a bearing race 6 in its middle portion intended to co-operate with bearing rollers 7 which are of a diameter to exactly fit between the bearing races 3 and 6. The bearing member 5 has inwardly extending ribs 8 located so as to provide thrust shoulders 9 cooperating with the end margins of the roller 7 to confine the latter against endwise movement.

Interposed between the bearing rollers 7 are spacer rollers 10 which have enlarged end portions 11 that have rolling engagement with races 12 which extend around the outside of the series of spacer rollers and are carried by end rings 13 which are fast on the inner bearing member 1, being preferably permanently mounted thereon by having press-fitted relation with the seats 4.

The rings 13 are also provided with shoulders 14 which engage the shoulders 15 at the inner ends of the seats 4 and extend beyond the bearing race 3 so as to overlap the ends of the bearing rollers 7, thereby locking the inner and outer bearing members against relative axial movement, except such slight amount as is desired for clearance between the parts.

In the form shown in Figures 3 and 4, the outer bearing member 16 corresponds in shape to the inner bearing member 1 of Figure 1 and the inner bearing member 17 corresponds in shape with the outer member 5 of Figure 1. The end rings 18 are press-fitted to the seats 19 in the outer bearing member and the end thrust ribs 20 are, in this form, located on the inner member 17. The spacer rollers 21 have their axes located inward of the axes of the bearing rollers 22 and the end portions 23 of the spacer rollers are of reduced diameter and have rolling engagement with races 24 on the end rings 18.

With the general arrangements of parts herein shown, the diameters of the rollers and their races may be so proportioned by adherence to theoretical correctness of dimensions as to insure that all contacting rotating surfaces will move with substantially pure rolling contact like that of the theoretical pitch surfaces of gearing and that the relative slipping of these parts, if there be any, due to inertia or momentum, will be reduced to a minimum by reason of the fact that the spacer rollers are driven independently of their contact with the bearing rollers but in properly timed relation thereto.

In all manufacturing operations, where mass production methods are employed, there is some variation in the dimensions of the parts from the theoretical mathematical ideal within a limited range of practical tolerance. I find in the manufacture of my bearings that I can compensate for this slight variation of dimensions by deliberately proportioning the parts so as to introduce a factor of localized wear on a relatively narrow surface that will allow the parts to quickly effect the compensating adjustment in a period of preliminary "tuning up".

To this end, I deliberately provide an excess of metal on the races for the spacer roller end portions, so that these races will be high enough to eliminate all play arising from the practical tolerances that are recognized in the dimensioning of the parts. These end bearing races will be initially "high" with respect to the mathematical ideal; that is, the races 12 of Fig. 1 will be of slightly less diameter, and the races 24 of the device of Fig. 3 will be of slightly greater diameter than the ideal. The parts are then assembled by force so as to introduce an element of initial pressure between the end portions 11 and 23 of the spacer rollers 10 and 21 with their respective races 12 and 24.

On account of the fact that the contacting surfaces of these end races with the spacer rollers are narrow compared with the surfaces of the spacer rollers 10 and bearing roller 7, this arrangement assures that the initial wear will be concentrated at these races, which are of minor importance compared with the surfaces of the main bearing rollers, their races and the body portions of the spacers. This wear will last only until the races have worn down sufficiently to practically eliminate the sliding action, due to deviation of the parts from the exact mathematical ideal dimensions for frictionless operation.

This wearing, or polishing down, of the spacer end races is accomplished at the factory by running the bearings with just enough load to force all rollers to turn for a limited period of time to "tune up" the bearing before delivery to the user.

In like manner the "high" surface or excess of material and the resulting preliminary wear may be on the spacer end portions instead of on their races, or both the spacer end surfaces and their races may be proportionately high, according to choice.

What is meant by the expressions "theoretical correctness" of proportions of parts of the bearing and substantially "pure rolling contact" between moving surfaces will be understood from the following explanatory statements:

For the outside spacer type: When the inner race turns inside the stationary outer race, the roller train (rolls 7 and spacers 10) progress in the same direction around the central axis, but at a proportionately slower speed (R. P. M.) than the inner race. Since spacer track 12 is integral with the inner race 3 and travels at the same R. P. M., the surface speed of said track 12 is greater than the speed of travel of the roller train around the central axis. Therefore, to eliminate slip at this point, the spacer ends 11 must be so proportioned that their peripheral speed in rotation around their own axis will just compensate for the over-run of spacer track 12 with respect to the speed of travel of the roller train around the central axis at the point of contact of track 12 with the spacer ends 11.

For the inside spacer type: When the inner race 17 turns inside the stationary outer race 16, the roller train (rollers 22 and spacers 21) progress around the central axis in the same direction but at a proportionately slower speed (R. P. M.) than the inner race 17. Since the spacer track 24 is integral with the outer race 16 and stationary, in order to eliminate slip at this point, the spacer ends 23 must be so proportioned that their peripheral speed in rotation around their own axis will just compensate for the speed of travel of the roller train around the central axis (at the point of contact of spacer ends 23 with the spacer track 24) with respect to the fixed spacer track 24.

It is impossible to state any definite dimension for the amount of excess material on the so-called "high" surfaces or to reduce this to a definite proportion of the theoretically correct diameters as this excess should be only enough to make it necessary to press the spacer roller ends into their running or assembled position with respect to their races and to compensate for such slight tolerance as is commercially necessary in machining the moving surfaces of the bearing.

Although the foregoing description and the drawings are directed to specific embodiments, it will be understood that details may be modified or omitted without departing from the spirit of the invention as defined by the following claims.

I claim:

1. In the manufacture of roller bearings having bearing races, bearing rollers, end-trunnioned spacer rollers and spacer roller trunnion races, all designed and proportioned to approximate pure rolling contact at all wearing surfaces, the method which consists in initially forming the trunnion races with excess material uniformly distributed around their bearing faces, assembling the bearing and then running the assembled bearing until this excess material is worn off.

2. The method of making roller bearings which consists in providing concentric cylindrical bearing races, multiple bearing rollers spaced apart circumferentially and having rolling fit between said races, spacer rollers alternately interposed between the bearing rollers, said spacer rollers being of larger diameter than the intervals between said bearing rollers and having extended end portions, and races for said end portions, proportioning the diameters of said rollers and said end portions and their races for substantially pure rolling contact but with slight excess of material on the faces of said end portion races to produce an initial pressure contact, and then causing the wearing away of said excess material by forced operation of the bearing.

3. In the manufacture of roller bearings having parts, comprising bearing rollers, bearing races, spacer rollers having extended end portions and spacer races for said end portions fixed to the more distant bearing race, the method of proportioning all of said parts for substantially pure rolling relation except that certain of said parts are made with predetermined uniformly "high" peripheral surfaces to localize initial wear to more closely approximate pure rolling contact between all of said parts after a predetermined amount of initial wear has occurred.

4. The method of making roller bearings which consists in providing concentric cylindrical bearing races, multiple bearing rollers spaced apart circumferentially and having approximately true rolling fit between said races, spacer rollers of larger diameter than the interval between the bearing rollers and alternately interposed between the bearing rollers and having extended end portions, and races for said end portions fixed to the more distant bearing races, proportioning the diameters of said rollers and said end portions and their races for approximately pure rolling contact but with a definitely predetermined slight excess of material positioned to localize initial wear, and then causing the wearing away of said excess material by forced operation of the bearing.

5. In the manufacture of a roller bearing comprising inner and outer members, having concentrically opposed bearing races, an annular series of bearing rollers fitting between said races, spacer rollers interposed between said bearing rollers and having extended end portions, and end rings having races in rolling engagement with said spacer roller end portions, the process steps of proportioning said parts for approximately pure rolling contact throughout, and then fabricating said parts so that an excess of material will be initially provided in predetermined location on certain of said parts to hold said spacer and bearing rollers in initial pressure contact with each other and concentrate the initial wear in said location, whereby after such initial wear the parts will be brought to approximate pure rolling contact at all rolling surfaces.

6. In the manufacture of a roller bearing comprising concentric bearing races, bearing rollers fitting between said bearing races, spacer rollers alternatingly interposed between said bearing rollers, said spacer rollers having body portions larger than the intervals between bearing rollers and having extended end portions, and spacer races engaging said end portions and secured in fixed relation to the more distant bearing race, the process steps of proportioning said parts for approximately pure rolling contact throughout, then fabricating the parts so that the spacer races will be slightly "high" to insure initial pressure contact and cause the initial wear to be concentrated at said spacer races.

VIVIAN EARLE TILLSON.